United States Patent
Goto et al.

(10) Patent No.: US 11,512,170 B2
(45) Date of Patent: Nov. 29, 2022

(54) METHOD FOR PRODUCING CARBINOL-MODIFIED ORGANOSILOXANE

(71) Applicant: SHIN-ETSU CHEMICAL CO., LTD., Tokyo (JP)

(72) Inventors: Tomoyuki Goto, Annaka (JP); Yusuke Okazawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/253,989

(22) PCT Filed: Jun. 13, 2019

(86) PCT No.: PCT/JP2019/023417
§ 371 (c)(1),
(2) Date: Dec. 18, 2020

(87) PCT Pub. No.: WO2020/008829
PCT Pub. Date: Jan. 9, 2020

(65) Prior Publication Data
US 2021/0269600 A1    Sep. 2, 2021

(30) Foreign Application Priority Data

Jul. 2, 2018  (JP) .............................. JP2018-125758
Nov. 22, 2018 (JP) .............................. JP2018-219162

(51) Int. Cl.
*C08G 77/08*   (2006.01)
*C08G 77/398*  (2006.01)

(52) U.S. Cl.
CPC ........... *C08G 77/08* (2013.01); *C08G 77/398* (2013.01)

(58) Field of Classification Search
CPC ............................... C08G 77/06; C08G 77/08
See application file for complete search history.

(56) References Cited

U.S. PATENT DOCUMENTS

| | | | |
|---|---|---|---|
| 5,250,490 A | 10/1993 | Ritscher et al. | |
| 5,395,955 A | 3/1995 | Okawa et al. | |
| 6,291,622 B1* | 9/2001 | Drose | C08G 77/46 528/25 |
| 6,372,874 B1 | 4/2002 | Cameron | |
| 6,410,772 B2* | 6/2002 | Okuyama | C08G 77/06 556/479 |
| 7,074,950 B2* | 7/2006 | Ochs | C08G 77/06 556/445 |
| 8,765,986 B2* | 7/2014 | Issberner | C08G 77/38 366/177.1 |
| 2005/0137412 A1* | 6/2005 | Ochs | C08G 77/06 556/445 |
| 2012/0272791 A1 | 11/2012 | Bai et al. | |
| 2013/0109772 A1 | 5/2013 | Bai et al. | |
| 2015/0291738 A1 | 10/2015 | Sugiura et al. | |
| 2016/0046797 A1 | 2/2016 | Abe et al. | |
| 2016/0060399 A1* | 3/2016 | Abe | C08G 64/186 528/37 |

FOREIGN PATENT DOCUMENTS

| | | |
|---|---|---|
| EP | 0 433 746 A2 | 6/1991 |
| JP | 60-206834 A | 10/1985 |
| JP | 63-289012 A | 11/1988 |
| JP | 4-88024 A | 3/1992 |
| JP | 4-120132 A | 4/1992 |
| JP | 5-269380 A | 10/1993 |
| JP | 10-17670 A | 1/1998 |
| JP | 10-182832 A | 7/1998 |

(Continued)

OTHER PUBLICATIONS

International Search Report issued in PCT/JP2019/023417 (PCT/ISA/210), dated Sep. 10, 2019.

(Continued)

*Primary Examiner* — Margaret G Moore
(74) *Attorney, Agent, or Firm* — Birch, Stewart, Kolasch & Birch, LLP

(57) ABSTRACT

A method for producing a carbinol-modified organosiloxane, which comprises steps (A) to (C), is an efficient production method whereby it becomes possible to reduce the production of a by-product of the reaction for the production of a terminal-carbinol-modified organosiloxane.

(A) a step of supplying the following components (a) to (c) to a tubular reactor continuously:
(a) an organohydrogensiloxane represented by formula (I)

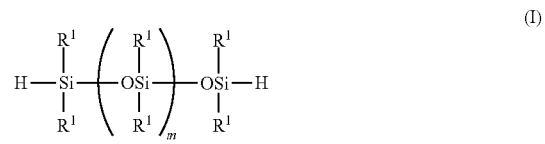

(wherein $R^1$'s independently represent a monovalent hydrocarbon group having 1 to 20 carbon atoms; and m represents an integer of 0 to 500);
(b) a compound represented by formula (II):

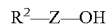

$R^2$—Z—OH (wherein $R^2$ represents a vinyl group or an allyl group; and Z represents a bivalent hydrocarbon group); and
(c) a platinum catalyst in an amount of 0.005 ppm by mass or more and less than 1.0 ppm by mass in terms of metal platinum content relative to the total amount of the components (a) to (c);

(B) a step of subjecting the components (a) to (c) to a hydrosilylation reaction while allowing these components to pass through the tubular reactor; and (C) a step of removing a reaction product.

12 Claims, No Drawings

(56) References Cited

FOREIGN PATENT DOCUMENTS

| | | |
|---|---|---|
| JP | 2000-72781 A | 3/2000 |
| JP | 2000-234025 A | 8/2000 |
| JP | 2003-82103 A | 3/2003 |
| JP | 2010-174081 A | 8/2010 |
| JP | 2012-236887 A | 12/2012 |
| JP | 2014-516943 A | 7/2014 |
| JP | 2015-504418 A | 2/2015 |
| WO | WO 2014/073605 A1 | 5/2014 |
| WO | WO 2014/157681 A1 | 10/2014 |
| WO | WO 2014/157682 A1 | 10/2014 |

OTHER PUBLICATIONS

Written Opinion of the International Searching Authority issued in PCT/JP2019/023417 (PCT/ISA/237), dated Sep. 10, 2019.

* cited by examiner

METHOD FOR PRODUCING CARBINOL-MODIFIED ORGANOSILOXANE

TECHNICAL FIELD

This invention relates to a method for preparing a carbinol-modified organosiloxane, and more particularly, to a method for efficiently preparing a terminally carbinol-modified organosiloxane while minimizing formation of side reaction products.

BACKGROUND ART

Carbinol-modified organosiloxanes are widely used as a modifier for polycarbonate and polyurethane resins (Patent Documents 1 to 4).

As the method for preparing such organosiloxanes in an industrially efficient manner, for example, Patent Document 5 discloses a method for continuously preparing a carbinol-terminated diorganopolysiloxane.

Generally, in the modification of a resin with a modifier, if an organosiloxane in which carbinol modification has been hampered by side reactions is used as the modifier, the resin may undergo a decline of molecular weight and eventually lose mechanical properties.

The current requirement for resins of further improved performance necessitates to minimize side reactions during the preparation of carbinol-modified organosiloxanes.

PRIOR ART DOCUMENTS

Patent Documents

Patent Document 1: JP-A H10-182832
Patent Document 2: WO 2014/073605
Patent Document 3: JP-A H04-120132
Patent Document 4: JP-A S63-289012
Patent Document 5: JP-A 2010-174081

SUMMARY OF INVENTION

Technical Problem

An object of the invention, which has been made under the above-mentioned circumstances, is to provide a method for efficiently preparing a carbinol-modified organosiloxane while minimizing formation of side reaction products in the terminal carbinol modification of organosiloxane.

Solution to Problem

Making extensive investigations to attain the above object, the inventors have found that a carbinol-modified organosiloxane having a minimal content of side reaction products is obtained by continuously reacting an organohydrogensiloxane with a carbinol compound in the presence of a predetermined amount of a platinum catalyst in a tubular reactor. The invention is predicated on this finding.

The invention is defined below.
1. A method for preparing a carbinol-modified organosiloxane comprising the steps of:
(A) continuously feeding components (a) to (c) to a tubular reactor, (a) an organohydrogensiloxane having the following formula (I):

[Chem. 1]

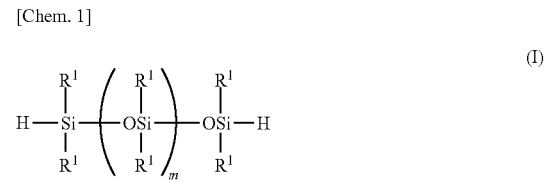

wherein $R^1$ is each independently a $C_1$-$C_{20}$ monovalent hydrocarbon group and m is an integer of 0 to 500,
(b) a compound having the following formula (II):

wherein $R^2$ is vinyl or allyl, Z is a divalent hydrocarbon group, at least one hydrogen atom in the divalent hydrocarbon group may be substituted by halogen or a $C_1$-$C_{20}$ monovalent hydrocarbon group, and at least one carbon atom in the divalent hydrocarbon group and the monovalent hydrocarbon group may be substituted by oxygen, nitrogen or sulfur,
(c) a platinum catalyst in an amount to give 0.005 ppm by weight to less than 1.0 ppm by weight of platinum metal based on the total weight of components (a) to (c),
(B) effecting hydrosilylation reaction of components (a) to (c) during passage through the tubular reactor to form a reaction product, and
(C) taking out the reaction product.
2. The method of 1 wherein step (A) includes mixing components (a) to (c) and then continuously feeding the mixture to the tubular reactor.
3. The method of 1 or 2 wherein component (c) is added in an amount to give 0.005 ppm by weight to 0.2 ppm by weight of platinum metal based on the total weight of components (a) to (c).
4. The method of any one of 1 to 3 wherein component (b) is a compound having the following formula (III):

[Chem. 2]

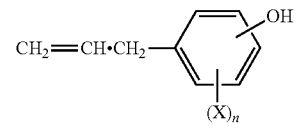

wherein X is halogen or a $C_1$-$C_{20}$ monovalent hydrocarbon group, at least one hydrogen atom in the monovalent hydrocarbon group may be substituted by halogen, at least one carbon atom in the monovalent hydrocarbon group may be substituted by oxygen, nitrogen or sulfur, and n is an integer of 0 to 4.
5. A carbinol-modified organosiloxane having the following formula (IV):

[Chem. 3]

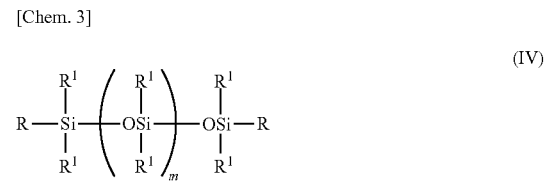

wherein R is each independently a group having the following formula (V) or (VI), $R^1$ is each independently a $C_1$-$C_{20}$ monovalent hydrocarbon group, and m is an integer of 0 to 500,

$$—(CH_2)_k—Z—OH \quad (V)$$

wherein k is 2 or 3, Z is a divalent hydrocarbon group, at least one hydrogen atom in the divalent hydrocarbon group may be substituted by halogen or a $C_1$-$C_{20}$ monovalent hydrocarbon group, and at least one carbon atom in the divalent hydrocarbon group and the monovalent hydrocarbon group may be substituted by oxygen, nitrogen or sulfur,

$$—O—Z—R^3 \quad (VI)$$

wherein Z is as defined above, $R^3$ is vinyl, allyl or a terminal group having $—(CH_2)_k—SiR^1{}_2O—$ resulting from reaction of Si—H in the following formula (I):

[Chem. 4]

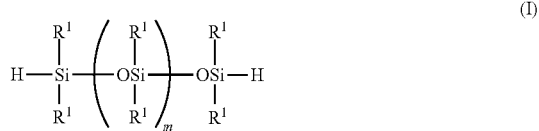

(I)

wherein $R^1$ and m are as defined above, with vinyl or allyl, and k is 2 or 3,

R being such that a ratio of [number of groups having formula (VI)]/[total number of groups having formulae (V) and (VI)] is less than 0.01.

6. The carbinol-modified organosiloxane of 5 wherein R is such that a ratio of [number of groups having formula (VI)]/[total number of groups having formulae (V) and (VI)] is up to 0.005.

7. The carbinol-modified organosiloxane of 5 or 6, having a platinum content of less than 0.50 ppm by weight.

8. The carbinol-modified organosiloxane of any one of 5 to 7, having a platinum content of less than 0.20 ppm by weight.

9. The carbinol-modified organosiloxane of any one of 5 to 8 wherein Z is a group having the following formula (VII):

[Chem. 5]

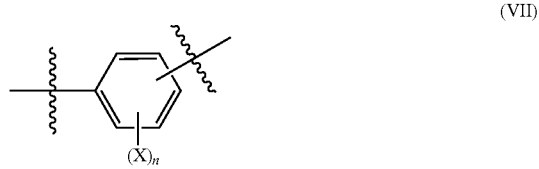

(VII)

wherein X is halogen or a $C_1$-$C_{20}$ monovalent hydrocarbon group, at least one hydrogen atom in the monovalent hydrocarbon group may be substituted by halogen, at least one carbon atom in the monovalent hydrocarbon group may be substituted by oxygen, nitrogen or sulfur, n is an integer of 0 to 4, and the wavy line designates a point of attachment.

Advantageous Effects of Invention

The preparation method of the invention is successful in efficiently forming a terminally carbinol-modified organosiloxane with less side reaction products.

With the inventive preparation method, the amount of platinum used can be reduced and the purification step can be accordingly simplified. Only a less amount of platinum is left behind, which prevents the resulting carbinol-modified organosiloxane from coloration due to the residual platinum.

The terminally carbinol-modified organosiloxane obtained from the inventive preparation method is useful as a resin modifier because of low contents of side reaction products and platinum.

DESCRIPTION OF EMBODIMENTS

Now the invention is described in detail.

The invention provides a method for preparing a carbinol-modified organosiloxane, comprising at least the following steps (A) to (C):

step (A) of continuously feeding components (a) to (c) to a tubular reactor, (a) an organohydrogensiloxane having the following formula (I):

[Chem. 6]

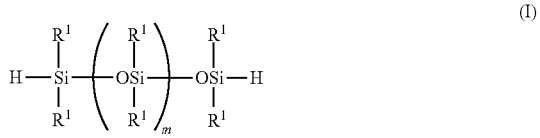

(I)

wherein $R^1$ is each independently a $C_1$-$C_{20}$ monovalent hydrocarbon group and m is an integer of 0 to 500, (b) a compound having the following formula (II):

$$R^2—Z—OH \quad (II)$$

wherein $R^2$ is vinyl or allyl, Z is a divalent hydrocarbon group, at least one hydrogen atom in the divalent hydrocarbon group may be substituted by halogen or a $C_1$-$C_{20}$ monovalent hydrocarbon group, and the divalent hydrocarbon group and the monovalent hydrocarbon group may be separated by oxygen, nitrogen or sulfur, (c) a platinum catalyst in an amount to give 0.005 ppm by weight (ppmw) to less than 1.0 ppmw of platinum metal based on the total weight of components (a) to (c), step (B) of effecting hydrosilylation reaction of components (a) to (c) during passage through the tubular reactor, and step (C) of taking out the reaction product.

(1) Step (A)

Step (A) is to continuously feed components (a) to (c) to a tubular reactor.

Component (a) is the organohydrogensiloxane having formula (I) wherein $R^1$ is each independently a $C_1$-$C_{20}$ monovalent hydrocarbon group.

The $C_1$-$C_{20}$, preferably $C_1$-$C_{10}$ monovalent hydrocarbon group $R^1$ may be straight, branched or cyclic, and examples thereof include straight or branched alkyl groups such as methyl, ethyl, n-propyl, isopropyl, butyl, isobutyl, tert-butyl, n-pentyl, neopentyl, n-hexyl, and n-octyl; cycloalkyl groups such as cyclopentyl, cyclohexyl, and cyclooctyl; aryl groups such as phenyl, tolyl, xylyl, and naphthyl; aralkyl groups such as benzyl, phenylethyl, and phenylpropyl; and substituted forms of the foregoing groups in which some or all of the hydrogen atoms are substituted by halogen (e.g., fluorine, bromine and chlorine).

Of these, $R^1$ is preferably a $C_1$-$C_6$ alkyl or $C_6$-$C_{10}$ aryl group, with methyl and phenyl being more preferred.

In formula (I), m is an integer of 0 to 500, preferably an integer of 0 to 300, and more preferably an integer of 30 to 200.

If m exceeds 500, the resulting carbinol-modified organosiloxane has too high a molecular weight and can detract from the transparency and mechanical properties of a resin when used as a resin modifier.

Component (b) is a carbinol (or phenol) derivative having formula (II). Hydrosilylation reaction of component (b) with Si—H groups at both ends of component (a) forms a carbinol (or phenol)-modified organosiloxane.

In formula (II), $R^2$ is vinyl or allyl, preferably allyl.

Z is a divalent hydrocarbon group. The carbon count of the divalent hydrocarbon group is preferably 1 to 20 carbon atoms, more preferably 1 to 10 carbon atoms, though not particularly limited.

The divalent hydrocarbon group may be straight, branched or cyclic, and examples thereof include straight, branched or cyclic alkylene groups such as methylene, ethylene, trimethylene, propylene, tetramethylene, pentamethylene, hexamethylene, cyclohexylene, and octamethylene; arylene groups such as o-phenylene, m-phenylene, p-phenylene, methylphenylene, ethylphenylene, methoxyphenylene, and naphthylene; and substituted forms of the foregoing groups in which some or all of the hydrogen atoms are substituted by halogen atoms (e.g., fluorine, bromine and chlorine), the above $C_1$-$C_{20}$ monovalent hydrocarbon groups or the like. It is noted that some carbon in the divalent hydrocarbon group and the monovalent hydrocarbon group may be substituted by oxygen, nitrogen or sulfur.

Of these, Z is preferably a phenylene group which may be substituted with X, having the following formula (VII).

[Chem. 7]

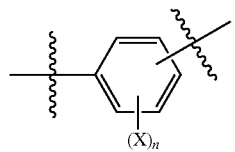

(VII)

Herein the wavy line designates a point of attachment.

X is halogen or a $C_1$-$C_{20}$ monovalent hydrocarbon group. Examples of the monovalent hydrocarbon group are as exemplified above for $R^1$. Some carbon in the monovalent hydrocarbon group may be substituted by oxygen, nitrogen or sulfur. Examples of the monovalent hydrocarbon group in which some carbon is substituted by oxygen include $C_1$-$C_5$ alkoxy groups such as methoxy, ethoxy, isopropoxy, n-butoxy, and tert-butoxy.

X is preferably a $C_1$-$C_5$ alkyl or $C_1$-$C_5$ alkoxy group, more preferably methyl or methoxy.

The subscript n is an integer of 0 to 4, preferably 0 or 1, and more preferably 0.

Therefore, compounds having the following formula (III) are preferred as component (b).

[Chem. 8]

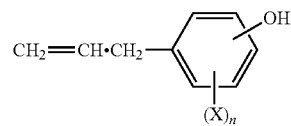

(III)

Herein X and n are as defined above.

Examples of component (b) which is preferably used herein include those of the following formulae, but are not limited thereto. Of these, (b-1), (b-2), (b-9; p=6), and (b-10; q=1, r=0) are especially preferred.

[Chem. 9]

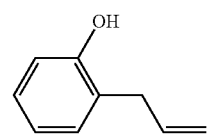

(b-1)

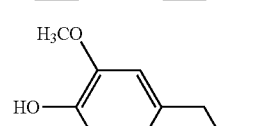

(b-2)

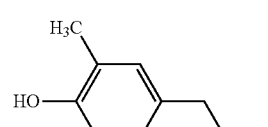

(b-3)

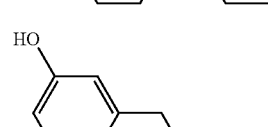

(b-4)

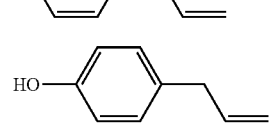

(b-5)

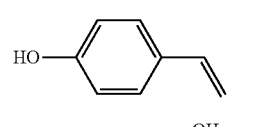

(b-6)

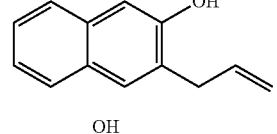

(b-7)

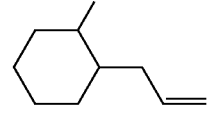

(b-8)

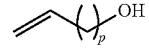

(b-9)

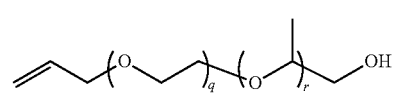

(b-10)

Herein p, q and r are each independently an integer of 0 to 50, preferably 0 to 10.

Component (c) is a platinum catalyst for promoting hydrosilylation. Examples of the platinum catalyst used herein include well-known catalysts such as platinum black, platinic chloride, chloroplatinic acid, the reaction products of chloroplatinic acid with monohydric alcohols, complexes of chloroplatinic acid with olefins, and platinum bisacetoacetate.

In step (A), components (a) and (b) are continuously fed to a tubular reactor in such a ratio that [moles of alkenyl groups in component (b)]/[moles of Si—H groups in component (a)] preferably ranges from 1.00 to 2.00, more preferably from 1.05 to 1.50, and even more preferably 1.02 to 1.10. If the ratio exceeds 2.00, sometimes unreacted component (b) must be removed or the cost of the reactant may be increased, with a loss of production efficiency. A ratio of less than 1.00 may increase the probability that side reaction occurs at the terminal reactive sites of the organosiloxane.

Component (c) is added in such an amount as to give 0.005 ppmw to less than 1.0 ppmw, preferably 0.005 to 0.50 ppmw, more preferably 0.005 to 0.20 ppmw, and even more preferably 0.010 to 0.10 ppmw of platinum metal based on the total weight of components (a) to (c). An amount of less than 0.005 ppmw of platinum causes a problem to the progress of hydrosilylation reaction. An amount of 1.00 ppmw or more increases the probability that side reaction occurs at the terminal reactive sites of the organosiloxane.

In step (A), components (a) to (c) may be continuously fed to a tubular reactor separately via feed tubes, or some or all of components (a) to (c) may be premixed, for example, in a stirred tank and then fed continuously to a tubular reactor.

Notably, the tubular reactor used herein is not particularly limited and may be suitably selected from well-known flow reactors which allow for reaction of components (a) to (c) during passage therethrough.

In step (A), the temperature at which components (a) to (c) are fed is not particularly limited. The temperature is preferably 0° C. to 150° C., more preferably 10° C. to 100° C., and even more preferably 20° C. to 80° C. for smooth progress of reaction in step (B).

In addition to components (a) to (c), a solvent may be added in step (A).

Examples of the solvent include alkanes such as pentane, hexane, octane, decane, isododecane, cyclopentane, cyclohexane, methylcyclohexane, and ethylcyclohexane; aromatic hydrocarbons such as benzene, toluene, xylene, and ethylbenzene; ethers such as diethyl ether, ethyl propyl ether, glyme, and diglyme; and alcohols such as ethanol, 1-propanol, and 2-propanol.

(2) Step (B)

Step (B) is to effect hydrosilylation reaction of component (a) with component (b) while passing components (a) to (c) through the tubular reactor.

The temperature in the tubular reactor in this step, though not particularly limited, is preferably 20° C. to 180° C., more preferably 40° C. to 150° C., and even more preferably 50° C. to 120° C. for enhancing the reaction efficiency and suppressing side reactions.

Notably, the total time of steps (A) and (B), though not particularly limited, is preferably 1 to 60 minutes, more preferably 3 to 45 minutes, and even more preferably 5 to 30 minutes, from the aspect of production efficiency.

(3) Step (C)

Step (C) is to take out the reaction product obtained in step (B).

The take-out rate of the reaction product depends on the feed rate in step (A) and is not particularly limited. From the aspect of efficient production, the rate is preferably at least 100 kg/h, more preferably at least 200 kg/h, and even more preferably at least 300 kg/h.

The taken-out reaction product may be used as such, but if necessary, may be purified by well-known means prior to use.

The inventive preparation method described above is efficient to produce a terminally carbinol-modified organosiloxane with minimal contents of side reaction products and platinum.

The carbinol-modified organosiloxane obtained from the inventive preparation method has the following formula (IV).

[Chem. 10]

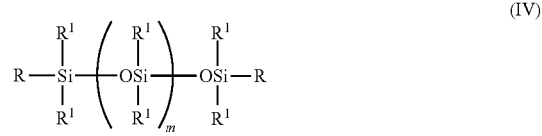

(IV)

Herein $R^1$ and m are as defined above.

In formula (IV), R is each independently a group having the following formula (V) or (VI).

(V)

(VI)

In formula (V), k indicative of the number of methylene groups derived from vinyl or allyl represented by $R^2$ in the compound of formula (II) used as the reactant is 2 or 3.

In formula (VI), $R^3$ is vinyl or allyl derived from $R^2$ in the compound of formula (II) used as the reactant, or a terminal group having —$(CH_2)_k$—$SiR^1_2O$— resulting from reaction of Si—H in the organohydrogensiloxane of formula (I) with vinyl or allyl in the carbinol compound of formula (II) used as the reactants, wherein k is 2 or 3.

In formulae (V) and (VI), Z is as defined above. Likewise, Z is preferably a group having the above formula (VII). More preferably, Z is selected from those of the following formulae which are derived from the above-described compounds preferred as component (b), even more preferably (Z-1), (Z-2), (Z-8; p=6), and (Z-9; q=1, r=0), but not limited thereto.

[Chem. 11]

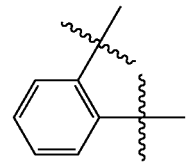

(Z-1)

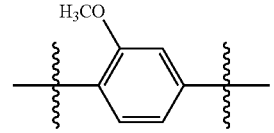

(Z-2)

-continued

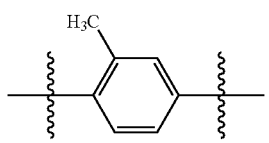 (Z-3)

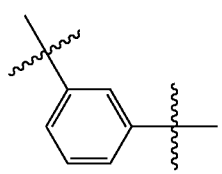 (Z-4)

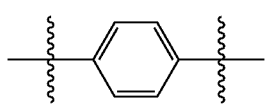 (Z-5)

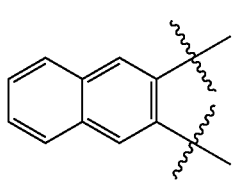 (Z-6)

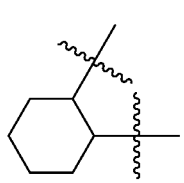 (Z-7)

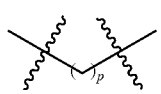 (Z-8)

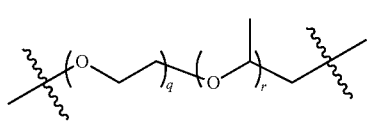 (Z-9)

Herein the wavy line designates a point of attachment.

The carbinol-modified organosiloxane of the invention is characterized by R which is such that a ratio of [number of groups having formula (VI)]/[total number of groups having formulae (V) and (VI)] is less than 0.01. If the ratio is 0.01 or more, the carbinol-modified organosiloxane contains more side reaction products and when used as a resin modifier, may invite a decline of the molecular weight of the resin, detracting from its mechanical properties.

Specifically, the preferred ratio of [number of groups having formula (VI)]/[total number of groups having formulae (V) and (VI)] is up to 0.005.

It is noted that the ratio used herein is computed in $^{29}$Si-NMR spectroscopy from the integrated value of signals assigned to Si of —O—Si(R$^1$)$_2$—CH$_2$— structure derived from formula (V) and the integrated value of signals assigned to Si of —O—Si(R$^1$)$_2$—O—Z— structure derived from formula (VI).

The content of platinum in the inventive carbinol-modified organosiloxane is preferably less than 0.50 ppmw, more preferably less than 0.20 ppmw. A platinum content within the range ensures to prevent coloration due to platinum of the carbinol-modified organosiloxane even when a purification step is omitted and coloration of a resin which is modified with the carbinol-modified organosiloxane.

Because of such a minimal impurity content, the carbinol-modified organosiloxane of the invention is useful as a resin modifier.

The resin to be modified therewith is not particularly limited, and examples thereof include polycarbonate, polyurethane, polyester, and epoxy resins.

EXAMPLES

Examples and Comparative Examples are given below for further illustrating the invention although the invention is not limited thereto.

As used herein, the term "terminal impurity ratio" refers to a ratio of [number of groups having formula (VI)]/[total number of groups having formulae (V) and (VI)], which was computed from the integrated value of signals assigned to Si of —O—Si(R$^1$)$_2$—CH$_2$— structure derived from formula (V) and the integrated value of signals assigned to Si of —O—Si(R$^1$)$_2$—O—Z— structure derived from formula (VI) in the $^{29}$Si-NMR spectrum of a carbinol-modified organosiloxane.

Example 1

While heating at 50° C., an organohydrogenpolysiloxane having the following average formula (1) at 380 kg/h, 2-allylphenol at 19 kg/h, and a platinum catalyst (i.e., toluene solution of 1,3-divinyl-1,1,3,3-tetramethyldisiloxane complex of neutralized chloroplatinic acid) at a rate to provide 0.02 ppmw of platinum metal based on the mixture in the system were each fed to a 150-L tubular reactor. The mixture was passed through the tubular reactor at 80° C. over 20 minutes for reaction. Thereafter the reaction product was continuously taken out into a storage tank. The carbinol-modified organosiloxane thus obtained had a terminal impurity ratio of 0.0010.

[Chem. 12]

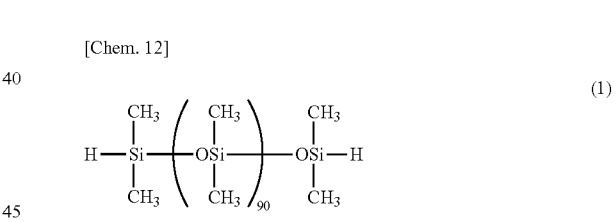 (1)

Example 2

The same procedure as in Example 1 was repeated except that the concentration of the platinum catalyst was changed to 0.10 ppmw of platinum metal. The resulting carbinol-modified organosiloxane had a terminal impurity ratio of 0.0025.

Example 3

The same procedure as in Example 1 was repeated except that the concentration of the platinum catalyst was changed to 0.48 ppmw of platinum metal. The resulting carbinol-modified organosiloxane had a terminal impurity ratio of 0.005.

Example 4

While heating at 50° C., 380 kg of an organohydrogenpolysiloxane having the average formula (1), 19 kg of 2-allylphenol, and an amount to provide 0.75 ppmw of platinum metal based on the mixture in the system of a platinum catalyst (i.e., toluene solution of 1,3-divinyl-1,1,3,3-tetramethyldisiloxane complex of neutralized chloroplatinic acid) were stirred and mixed for 10 minutes in a stirred tank. The resulting mixture was passed through a 150-L tubular reactor at 80° C. and 400 kg/h over 20 minutes for reaction. Thereafter the reaction product was continuously taken out into a storage tank. The resulting carbinol-modified organosiloxane had a terminal impurity ratio of 0.009.

Example 5

The same procedure as in Example 1 was repeated except that 23 kg/h of eugenol was fed instead of 19 kg/h of 2-allylphenol and the concentration of the platinum catalyst was changed to 0.90 ppmw of platinum metal. The resulting carbinol-modified organosiloxane had a terminal impurity ratio of 0.008.

Comparative Example 1

The same procedure as in Example 4 was repeated except that the concentration of the platinum catalyst was changed to 1.0 ppmw of platinum metal. The resulting carbinol-modified organosiloxane had a terminal impurity ratio of 0.010.

Comparative Example 2

The same procedure as in Example 1 was repeated except that the concentration of the platinum catalyst was changed to 1.5 ppmw of platinum metal. The resulting carbinol-modified organosiloxane had a terminal impurity ratio of 0.021.

The invention claimed is:
1. A method for preparing a carbinol-modified organosiloxane comprising the steps of:
(A) continuously feeding components (a) to (c) to a tubular reactor,
(a) an organohydrogensiloxane having the following formula (I):

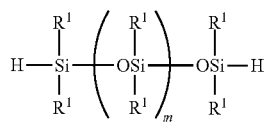

(I)

wherein $R^1$ is each independently a $C_1$-$C_{20}$ monovalent hydrocarbon group and m is an integer of 0 to 500,
(b) a compound having the following formula (III):

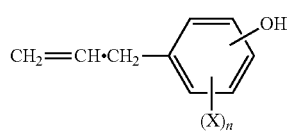

(III)

wherein X is halogen or a $C_1$-$C_{20}$ monovalent hydrocarbon group, at least one hydrogen atom in the monovalent hydrocarbon group may be substituted by halogen, at least one carbon atom in the monovalent hydrocarbon group may be substituted by oxygen, nitrogen or sulfur, and n is an integer of 0 to 4,
(c) a platinum catalyst in an amount to give 0.005 ppm by weight to less than 0.10 ppm by weight of platinum metal based on the total weight of components (a) to (c),
(B) effecting hydrosilylation reaction of components (a) to (c) during passage through the tubular reactor to form a reaction product, and
(C) taking out the reaction product,
wherein the reaction product has the following formula (IV):

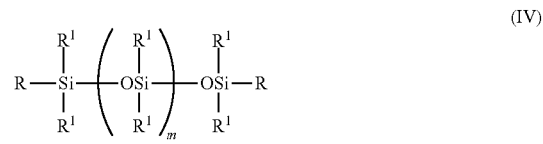

(IV)

wherein each R is independently a group having the following formula (V) or (VI), each $R^1$ is independently a $C_1$-$C_{20}$ monovalent hydrocarbon group, and m is an integer of 0 to 500,

—(CH$_2$)$_k$—Z—OH (V)

wherein k is 2 or 3, Z is a group having the following formula (VII):

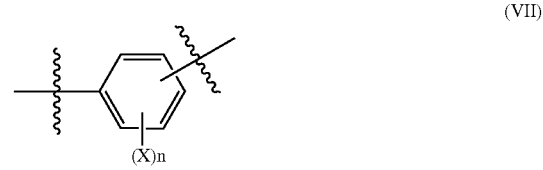

(VII)

wherein X is halogen or a $C_1$-$C_{20}$ monovalent hydrocarbon group, at least one hydrogen atom in the monovalent hydrocarbon group may be substituted by halogen, at least one carbon atom in the monovalent hydrocarbon group may be substituted by oxygen, nitrogen or sulfur, n is an integer of 0 to 4, and the wavy line designates a point of attachment,

—O—Z—R$^3$ (VI)

wherein Z is as defined above, $R^3$ is vinyl, allyl or a terminal group having —(CH$_2$)$_k$—SiR$^1$$_2$O— resulting from reaction of Si—H in the following formula (I):

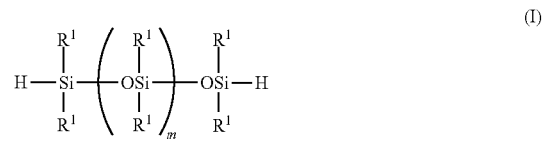

(I)

wherein $R^1$ and m are as defined above, with vinyl or allyl, and k is 2 or 3,
R being such that a ratio of [number of groups having formula (VI)]/[total number of groups having formulae (V) and (VI)] is less than 0.01,
wherein the components (a) and (b) are continuously fed to a tubular reactor in such a ratio that [moles of alkenyl groups in component (b)]/[moles of Si—H groups in component (a)] ranges from 1.02 to 1.10 in the step (A).

2. The method of claim 1 wherein step (A) includes mixing components (a) to (c) and then continuously feeding the mixture to the tubular reactor.

3. The method of claim 1, wherein R is such that a ratio of [number of groups having formula (VI)]/[total number of groups having formulae (V) and (VI)] is up to 0.005.

4. The method of claim 1, wherein the reaction product has a platinum content of less than 0.50 ppm by weight.

5. The method of claim 1, wherein the reaction product has a platinum content of less than 0.20 ppm by weight.

6. A method for preparing a carbinol-modified organosiloxane comprising the steps of:
(A) continuously feeding components consisting of (a), (b), (c), and a solvent to a tubular reactor, wherein the solvent is at least one selected from the group consisting of alkanes, aromatic hydrocarbons, alcohols, diethyl ether, ethyl propyl ether, glyme, and diglyme;
(a) an organohydrogensiloxane having the following formula (I):

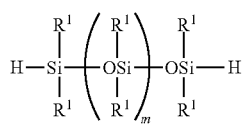
(I)

wherein $R^1$ is each independently a $C_1$-$C_{20}$ monovalent hydrocarbon group and m is an integer of 0 to 500,
(b) a compound having the following formula (III)

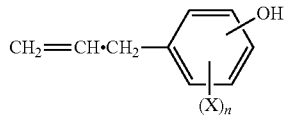
(III)

wherein X is halogen or a $C_1$-$C_{20}$ monovalent hydrocarbon group, at least one hydrogen atom in the monovalent hydrocarbon group may be substituted by halogen, at least one carbon atom in the monovalent hydrocarbon group may be substituted by oxygen, nitrogen or sulfur, and n is an integer of 0 to 4,
(c) a platinum catalyst in an amount to give 0.005 ppm by weight to less than 0.10 ppm by weight of platinum metal based on the total weight of components (a) to (c),
(B) effecting hydrosilylation reaction of components (a) to (c) during passage through the tubular reactor to form a reaction product, and
(C) taking out the reaction product,
wherein the reaction product has the following formula (IV):

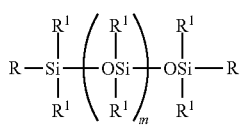
(IV)

wherein each R is independently a group having the following formula (V) or (VI), each $R^1$ is independently a $C_1$-$C_{20}$ monovalent hydrocarbon group, and m is an integer of 0 to 500,

—(CH$_2$)$_k$—Z—OH (V)

wherein k is 2 or 3, Z is a group having the following formula (VII):

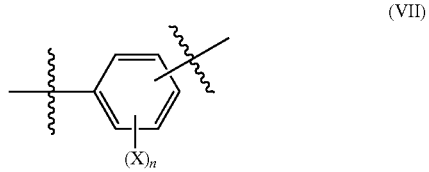
(VII)

wherein X is halogen or a $C_1$-$C_{20}$ monovalent hydrocarbon group, at least one hydrogen atom in the monovalent hydrocarbon group may be substituted by halogen, at least one carbon atom in the monovalent hydrocarbon group may be substituted by oxygen, nitrogen or sulfur, n is an integer of 0 to 4, and the wavy line designates a point of attachment,

—O—Z—R$^3$ (VI)

wherein Z is as defined above, $R^3$ is vinyl, allyl or a terminal group having —(CH$_2$)$_k$—SiR$^1_2$O— resulting from reaction of si-h in the following formula (I):

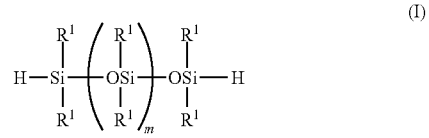
(I)

wherein $R^1$ and m are as defined above, with vinyl or allyl, and k is 2 or 3,
R being such that a ratio of [number of groups having formula (VI)]/[total number of groups having formulae (V) and (VI)] is less than 0.01,
wherein the components (a) and (b) are continuously fed to a tubular reactor in such a ratio that [moles of alkenyl groups in component (b)]/[moles of Si—H groups in component (a)] ranges from 1.02 to 1.10 in the step (A).

7. The method of claim 1, wherein the components fed to the tubular reactor further comprise at least one solvent selected from the group consisting of alkanes, aromatic hydrocarbons, alcohols, diethyl ether, ethyl propyl ether, glyme, and diglyme.

8. The method of claim 7, wherein the solvent fed to the tubular reactor consists of at least one solvent selected from the group consisting of alkanes, aromatic hydrocarbons, alcohols, diethyl ether, ethyl propyl ether, glyme, and diglyme.

9. The method of claim 6, wherein step (A) includes mixing components (a) to (c) and then continuously feeding the mixture to the tubular reactor.

10. The method of claim 6, wherein R is such that a ratio of [number of groups having formula (VI)]/[total number of groups having formulae (V) and (VI)] is up to 0.005.

11. The method of claim 6, wherein the reaction product has a platinum content of less than 0.50 ppm by weight.

12. The method of claim 6, wherein the reaction product has a platinum content of less than 0.20 ppm by weight.

\* \* \* \* \*